United States Patent Office 3,644,514
Patented Feb. 22, 1972

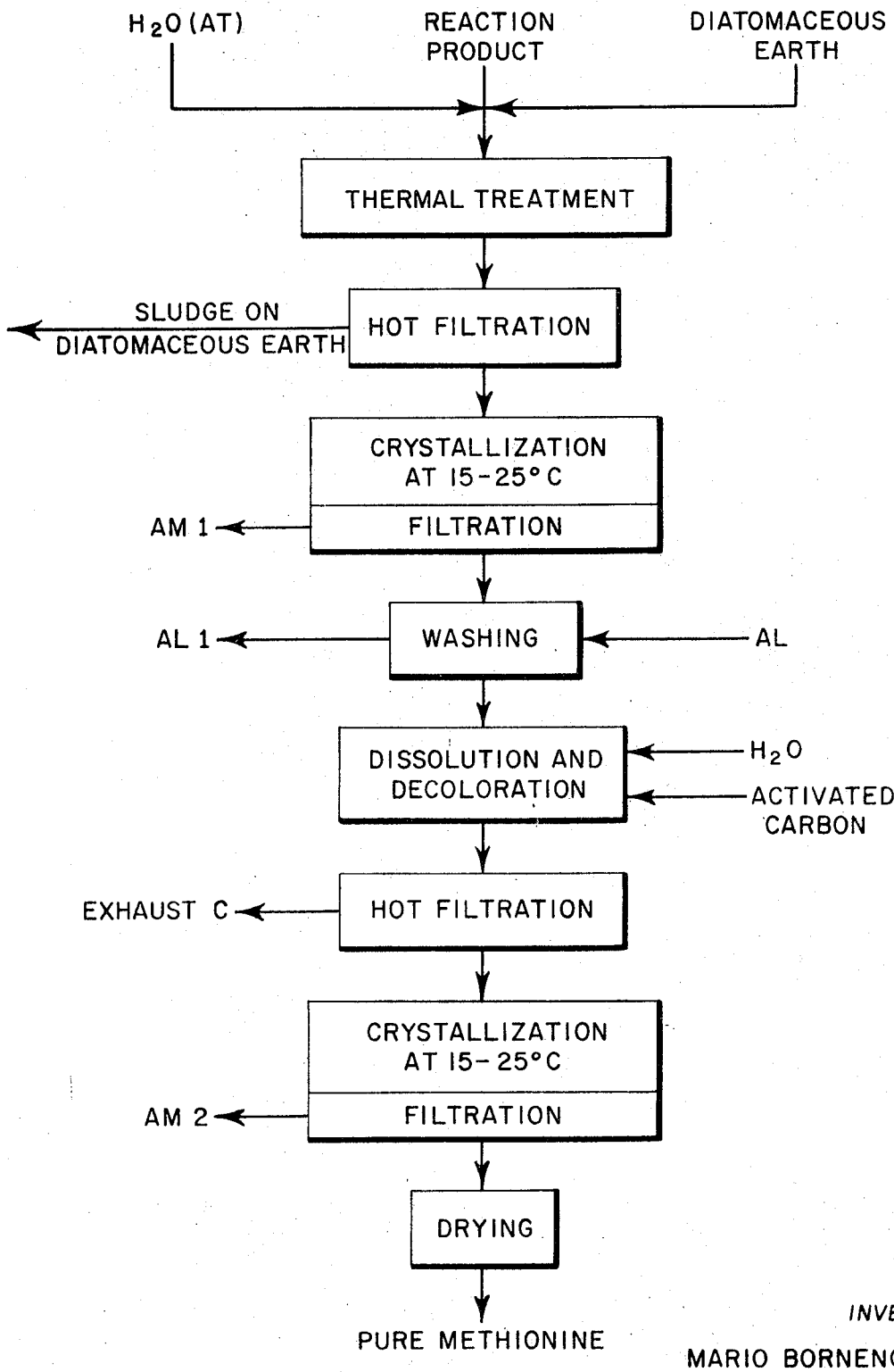

3,644,514
PROCESS FOR SEPARATING PURE METHIONINE FROM THE HYDROLYSIS PRODUCT OF ITS NITRILE
Mario Bornengo, Novara, and Pietro Pasquino, Vercelli, Italy, assignors to Montecatini Edison S.p.A., Milan, Italy
Filed Nov. 17, 1969, Ser. No. 877,171
Claims priority, application Italy, Nov. 18, 1968, 23,877/68
Int. Cl. C07c 149/20, 149/24
U.S. Cl. 260—534 S 4 Claims

ABSTRACT OF THE DISCLOSURE

There is disclosed a method for separating pure methionine from mixtures comprising it, and more particularly from the crude reaction product obtained by sulphuric acid hydrolysis of 2-amino-4-methylmercapto-butyronitrile followed by neutralization of the crude hydrolysis product by means of ammonia. A sufficient quantity of water is added to the neutralized mass to completely dissolve the methionine, the solution is heated at 95° C. to 135° C. under pressure, the insoluble sludges are separated under heating, and the purified solution is cooled to effect crystallization of methionine having a titer higher than 99%.

THE PRIOR ART

Methionine is useful in various technological fields, and is of particular use in animal feeds.

As is known, it is prepared from acrolein and methylmercaptan which, in contact with basic catalysts, yield methyl-mercapto-propionaldehyde. The latter compound, when treated with HCN and $NH_3$ (Strecker reaction) undergoes amination to 2-amino-4-methylmercaptobutyronitrile, which is hydrolyzed with sulphuric acid and then neutralized with aqueous ammonia, to give a solution, at a pH of 6.2–6.3 containing methionine:

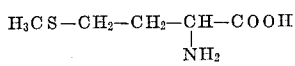

In addition to methionine, the crude reaction product contains ammonium sulphate and/or bisulphate (produced by hydrolysis of the nitrile) and the organic by-products of the Strecker reaction. These by-products, which are red-brown in color and of undefined chemical nature, are formed of C, H, N, O, and S atoms and contain iminocompounds. The presence thereof hinders the separation of methionine from ammonium sulphate. In fact, those by-products interfere with the crystallization and the filtration, increasing the solubility of methionine in the saline solution, whereby the separation of methionine becomes very difficult. Furthermore, total elimination of the by-products, being difficult, requires the use of large quantities of active carbon for the decolorizing step, with consequent loss of methionine. All of these factors increase the cost of synthetic methionine.

It is known, in the prior art, to remove the by-products contained in the crude reaction product by adding thereto ammonium sulphate at a pH of 5–6, which causes the coagulation of the by-products and has a salifying action on the methionine. It is also known to absorb the impurities on active granular carbon, to extract them with selective solvents under heating, or to extract the methionine from the crude product by means of liquid ammonia.

Processes for rendering the methionine odorless by boiling with aqueous solutions of $CH_2O$, or of vanillin, are also known.

The known methods for obtaining the methionine have the drawbacks of utilizing costly reactants and equipment, as well as of involving operational difficulties.

THE PRESENT INVENTION

One object of the present invention is to provide a process for separating odorless, colorless methionine having a high degree of purity from the crude reaction product.

Another object is to provide such a process which is free of the drawbacks of the known processes, and which is simple, practical, and inexpensive.

These and other objects are achieved by this invention, in accordance with which pure methionine is separated from the crude reaction product obtained by hydrolysis of 2-amino-4-methylmercapto-butyronitrile with sulphuric acid, followed by neutralization of the hydrolysis product to a pH of 6.2–6.3 with ammonia, by adding, to the crude neutralized reaction product containing methionine in suspension, a sufficient quantity of water to completely dissolve the methionine, subjecting the mass to a thermal treatment at a temperature comprised between 95° C. and 135° C. and under a pressure comprised between 1 and 5 atmospheres, for from 5 to 15 minutes, separating, under heat, the insoluble sludges which are formed, and then cooling the purified solution remaining after the sludge removal, to effect crystallization of methionine having a titer greater than 99%.

By operating under the conditions described, the organic by-products of the reaction first become insoluble and separate as oily drops, then coagulate as tarry sludges which float on the aqueous solution and are easily separated from the solution by filtering, decanting, or centrifuging.

The thermal treatment, carried out at atmospheric pressure, requires temperatures of from 95° C. to 105° C., and water in an amount of from 40 ccs. to 70 ccs. per 100 grams of raw reaction product, depending on the concentration of methionine and the temperature used. The treatment at atmospheric pressure is easily carried out by means of reflux boiling.

When the thermal treatment is carried out under pressure, either autogenous or of an inert gas, higher temperatures may be used, and smaller amounts of water are required for solubilizing the methionine. Thus, at a pressure of 2.0 atmospheres, the mixture comprising the methionine boils at 128° C. to 132° C. and only 5 to 20 ccs. of water for each 100 grams of raw reaction product are required to dissolve the methionine.

At higher pressures (for instance, up to 5 atmospheres), higher temperatures can be used and even smaller quantities of water are needed. However, the higher pressures require the use of pressure-resistant vessels and, furthermore, the treatment becomes more difficult. For these reasons, it is preferable to carry out the thermal treatment at a pressure in the range of 1.0 to 2.0 atmospheres.

In carrying out the invention, the water is added little by little to the raw reaction product at the selected temperature, until complete dissolution of the methionine is achieved. This permits use of the minimum quantity of water necessary for dissolving the methionine, in order to reduce the volume of the mother liquors and, therefore, the amount of methionine flowing out with them.

It is also possible, working with the same type of neutralized raw reaction product, to add all of the water required for dissolving the methionine thereto and then bring the mass to the desired temperature.

The water used in either embodiment may be fresh water, water used to wash the methionine, or the mother liquor of the recrystallization of the methionine. Preferably, mother liquors prior to the crystallization of the methionine are not used in the dissolving step because of the high content of ammonium sulphate present therein.

The tarry sludges formed during the heat treatment vary in consistency from a sticky, soft solid to a dry, hard solid.

In order to facilate filtration of the sludges and avoid clogging of the filters, it is useful to operate in the presence of filtration adjuvants which are added to the raw reaction product prior to subjecting the same to the thermal treatment. In this way, the sludges are absorbed uniformly by the adjuvant which is then easily removed from the filter.

Filtration adjuvants which are suitable for use in the process of this invention include siliceous sand, diatomite, kiesel-guhr, celite, fuller's earth, bentonite, and pumice powder. The adjuvants can be used in amounts between 0.1% and 1.0% by weight, based on the weight of the raw reaction product, and depending on the sludge content.

According to a preferred embodiment of this invention, illustrated in the accompanying drawing, the neutralized raw reaction product containing methionine is filtered hot, after the addition of the water and the thermal treatment, in order to separate the sludges.

The straw-colored, clear filtrate is cooled down to 15° C. to 25° C., to crystallize the methionine which is separated by filtering in the cold. The mother liquors AM1 of this crystallization are rejected.

The cake of raw methionine is washed repeatedly with water to remove residual ammonium sulphate, the water from the first washing AL1 being rejected, and the water from the second (and subsequent) washing being recycled to the first washing stage. The water for the last washing AL is preferably a recrystallization mother liquor from a subsequent process stage.

After the repeated washing, the methionine already has a titer, on the dry basis, higher than 99% and is suitable for use in animal feeds.

In order to remove possible traces of color, the moist methionine is dissolved in fresh water or in recrystallization water AM2 at boiling temperature (99° C.–102° C.) for supplying an almost saturated solution containing from 14% to 16% of methionine. Activated carbon is then added, in an amount of from 1% to 2% by weight, based on the methionine weight, the solution is stirred for from 1 to 10 minutes, and is then filtered hot to separate the coal. By cooling, crystallizing, filtering and drying the decolorized solution at from 100° C. to 106° C., a pure methionine is obtained. The recrystallization waters AM2 are recycled to the decolorizing stage, to the washing stage AL, or to the thermal treatment stage AT.

The methionine thus obtained is colorless and odorless, occurs in the form of white needless, and has a titer comprised between 99.2% and 99.8%. It is recovered in amounts of from about 80 to about 82% when the thermal treatment is caried out at atmospheric pressure, and in amounts of from about 86% to about 90%, when operating at 2.0 atmospheres.

The following examples are given to illustrate the invention and are not intended to be limiting.

Example 1

By heating at boiling point for 2 hours 2-amino-4-methylmercaptobutyronitrile with $H_2SO_4$ at 60% and by then neutralizing at pH 6–6.2 with $NH_3$ at 20%, a raw saponification product was obtained having $d_4^{20}=1.25$ and containing 13% of methionine, 34–36% of ammonium sulphate and 2% of organic by-products.

200 g. of this raw product were diluted with 100 cc. of water and heated for 10 minutes at 98° C. Following the thermal treatment, an oil separated which rapidly coagulated giving rise to black sludges (2 g.) that floated on the solution and were removed by hot filtration.

The aqueous solution thus purified from the organic impurities was cooled down to 20° C.; in this way raw methionine crystallized (35 g.), polluted by ammonium sulphate, which was then filtered from the mother liquors (250 g., $d_4^{20}=1.16$, at 27% of ammonium sulphate and at 2.1% of methionine).

The raw methionine was then washed on the filter with methionine-saturated water (mother liquors coming from previous crystallizations) in order to remove the ammonium sulphate. The technical methionine was then treated at boiling point with 130 g. of mother liquors AM2 in the presence of active carbon (2% on the methionine) for 10 minutes.

The mass was then filtered and crystallized at room temperature and in this way methionine was obtained which, after drying at 104° C., had a titer of 99.6%.

In the technical methionine is directly dried at 105° C., without treating it with active carbon, a product with a straw-yellow color and having a titer of 99.2% is obtained.

Example 2

The following example describes the separation of methionine from the raw reaction product according to the known prior art.

200 g. of raw product, having the composition specified in Example 1, were directly filtered in order to remove the mother liquors ($d_4^{20}=1.23$): the solid residue was then washed on the filter with methionine-saturated water AM2 for removing the residual ammonium sulphate.

The technical methionine was then treated at boiling point with 200 g. of mother liquors AM2 free of sulphates, in the presence of active carbon (7% on the methionine) for 10 minutes. The methionine was then filtered and crystallized at room temperature. The methionine thus obtained, after drying at 104° C., had a titer of 98%, a slight odor, and a straw-like color.

Following further recrystallization in the presence of active carbon, the titer in methionine increased to 98.35%.

Example 3

200 g. of raw product having the composition described in Example 1, were added to 10 cc. of water and were then heated for 10 minutes under a pressure of 1 atm. of nitrogen at 132° C.

Following the thermal treatment, an oil separated, which coagulated rapidly giving risk to black sludges (2.5 g.).); these sludges were then separated from the solution by filtering under pressure at 132° C. The mother liquors (AM1) of the first crystallization had $d_4^{20}=1.22$ and weighed 175 g.: they contained 37% of ammonium sulphate and 1.38% of methionine. The methionine, thus purified of the organic impurities, was further treated as in Example 1.

The quantity of methionine obtained (23.8 g.), having a titer of 99.35%, was about 10% higher than that obtained according to Example 1, owing to the lower losses in methionine of the mother liquors.

Example 4

200 g. of raw product containing 15.8% of methionine, were added to 50 cc. of water and 1 g. of daitomite and subsequently stirred in an autoclave for 10 minutes at 130° C. at a pressure of 2 atmospheres. The slurry was then filtered under heat (130° C.), thereby separating the diatomite cake (1.8 g.) containing the adsorbed sludges.

From the aqueous solution thus obtained, by crystallization at 20° C. and by subsequent filtration, the mother liquors (207 g., $d_4^{20}=1.20$) containing 1.53% of methionine, were separated. The cake, after washing with recrystallization water AM2 was decolorized by boiling for 5 minutes in 195 g. of recrystallization water AM2 with 0.7 g. of active carbon.

After separation of the coal by hot filtering, the mass was crystallized at 20° C. and the product was filtered, and then dried at 104° C. Thereby, 28.5 g. of a white crystalline methionine having a titer of 99.67% were obtained.

As will be apparent, some changes and variations may be made in practicing the invention without departing from the spirit thereof. Therefore, we intend to include, in the scope of the appended claims, all such modifications as will be obvious to those skilled in the art from the description and working examples given herein.

What is claimed is:

1. A process for separating pure methionine from a raw reaction product obtained by hydrolysis with sulphuric acid of 2-amino-4-methylmercaptobutyronitrile and by subsequent neutralization to a pH of 6.2–6.3 with ammonia, characterized in that to the raw reaction product, containing methionine in suspension, water is added in a quantity sufficient for completely dissolving the methionine, the solution is then subjected to a thermal treatment at a temperature of from 95° C. to 135° C. under a pressure of from 1.0 atmosphere to 5.0 atmospheres, for 5 to 15 minutes, the insoluble sludges thus formed are then separated under heat, and methionine having a titer higher than 99% is crystallized from the purified solution by cooling.

2. The process according to claim 1, characterized in that water is added to the raw reaction product in an amount of from 40 ccs. to 70 ccs per 100 grams of the raw product, and the mass is then subjected to a thermal treatment for 5 to 15 minutes at from 95° C. to 105° C., under a pressure of 1 atmosphere.

3. The process according to claim 1, characterized in that water is added to the raw reaction product in an amount of from 5 ccs. to 20 ccs. per 100 grams of raw product, and the mass is then subjected to a thermal treatment for 5 to 15 minutes at 128° C. to 132° C., under a pressure of 2 atmospheres.

4. The process according to claim 1, characterized in that, before the thermal treatment, a filtering adjuvant is added to the raw reaction product in an amount of from 0.1% to 1% by weight on the raw product.

References Cited
UNITED STATES PATENTS

| | | | |
|---|---|---|---|
| 3,517,048 | 6/1970 | Thoma et al. | 260—534 S |
| 2,504,425 | 4/1950 | Kralovec | 260—534 S |

LORRAINE A. WEINBERGER, Primary Examiner

J. L. DAVISON, Assistant Examiner